Patented Feb. 15, 1944

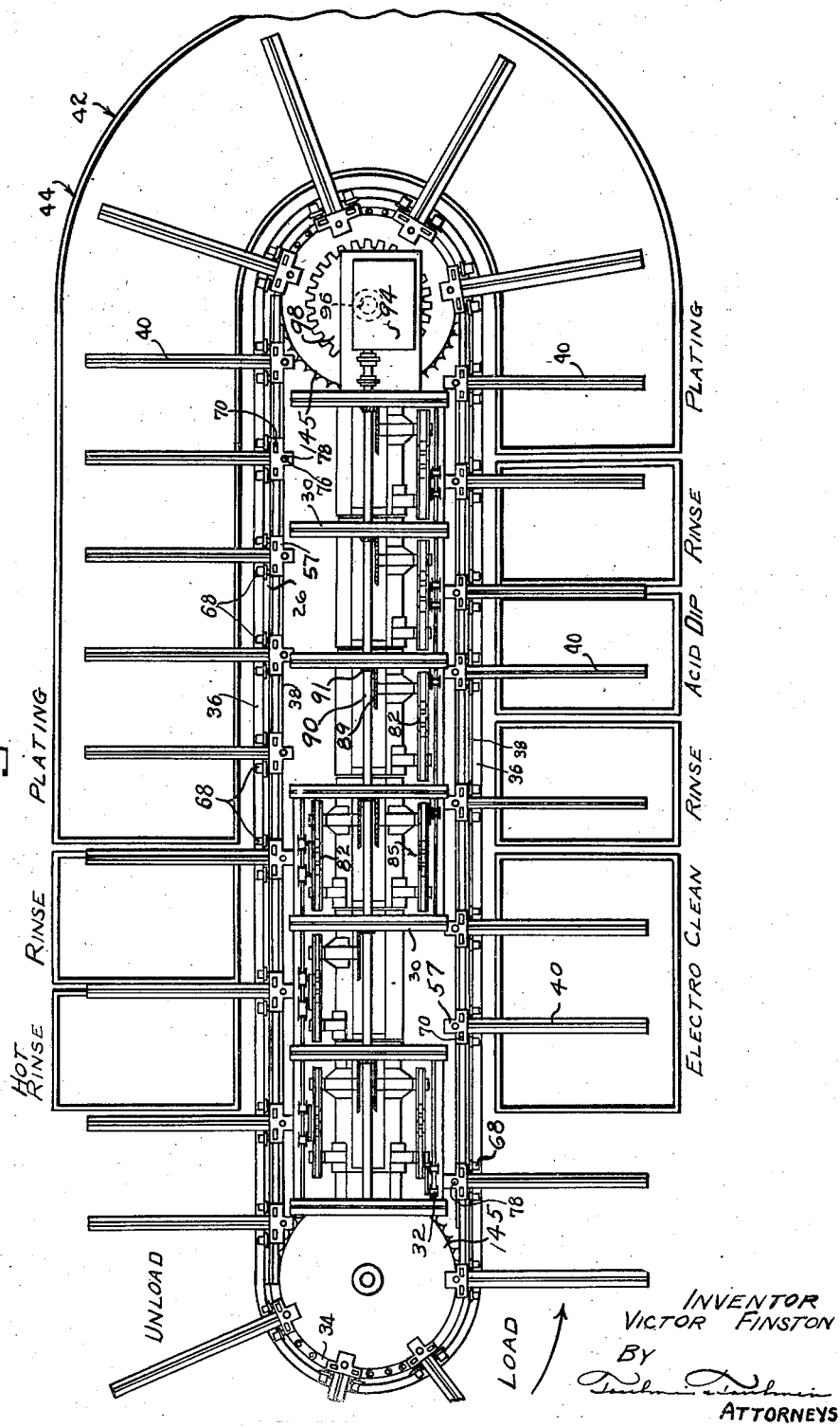

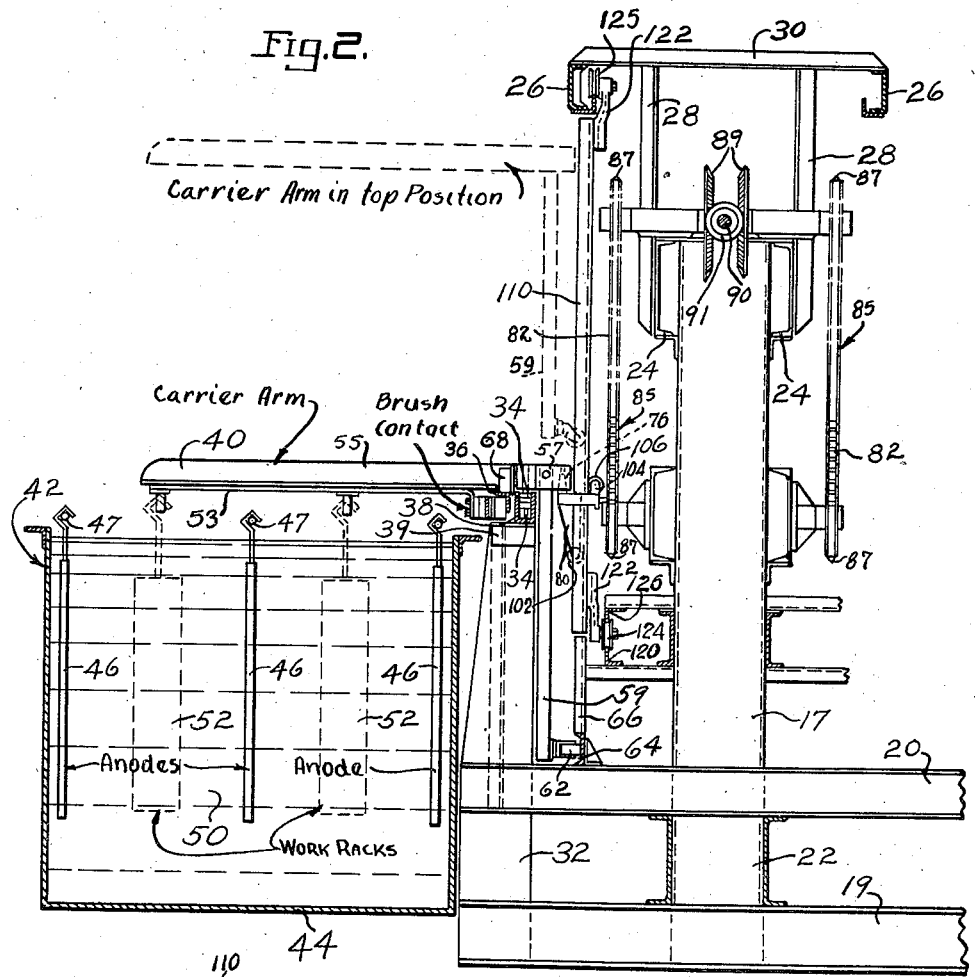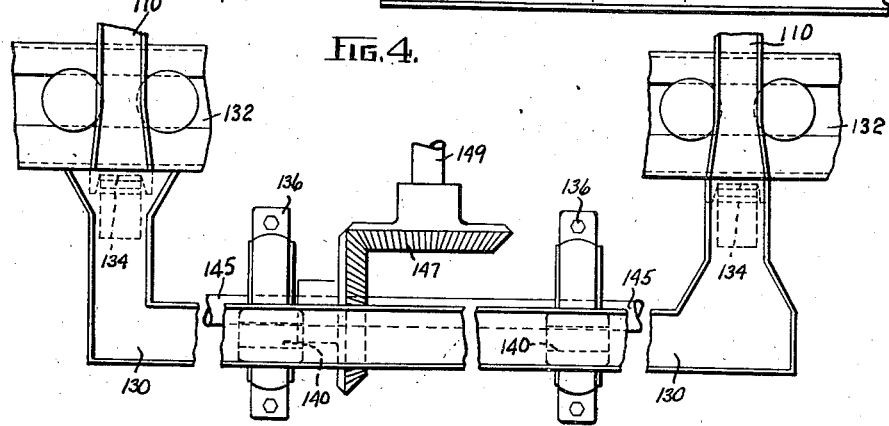

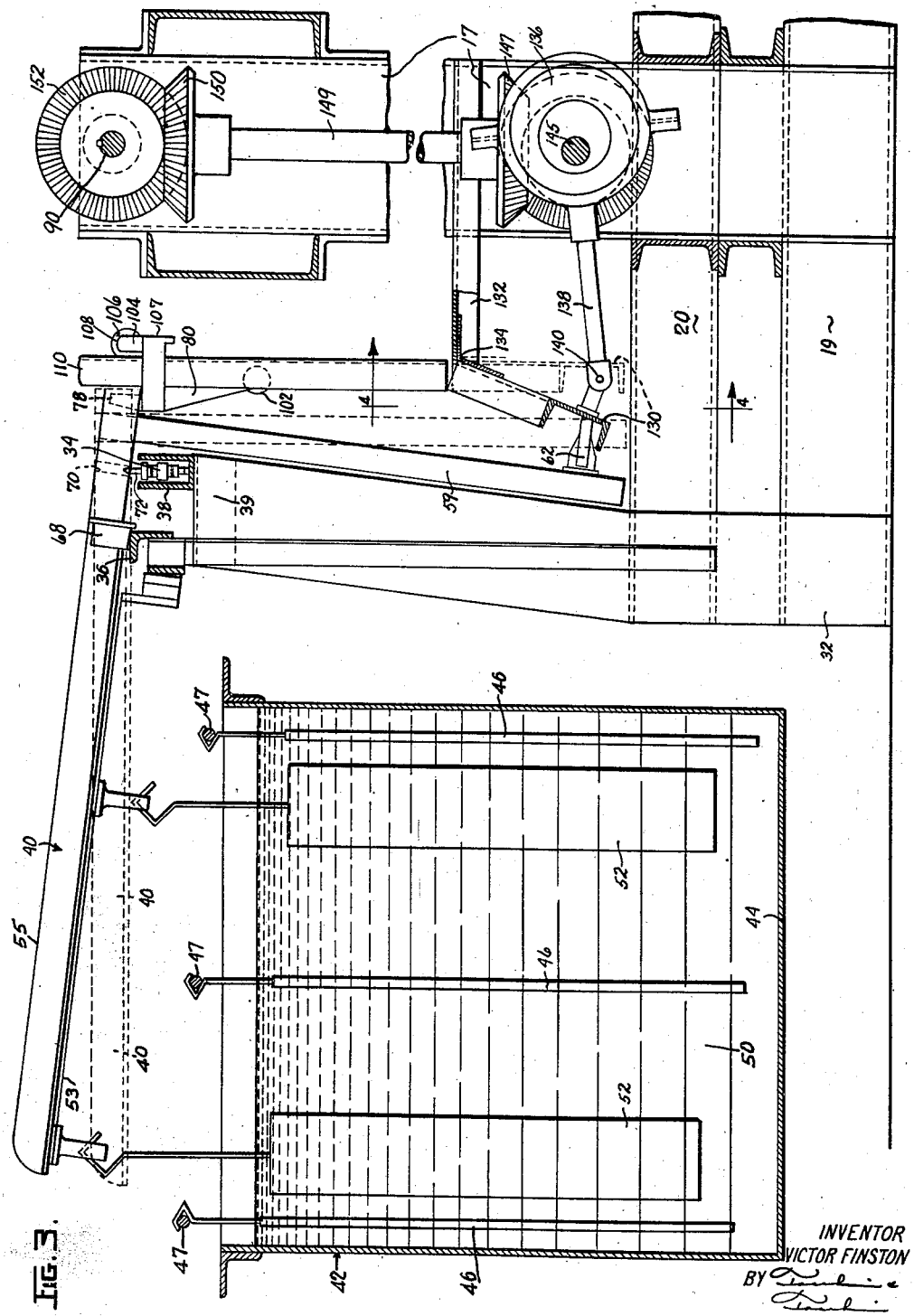

2,341,606

UNITED STATES PATENT OFFICE 2,341,606

ELECTROPROCESSING MACHINE

Victor Finston, Chicago, Ill., assignor to The Meaker Company, Chicago, Ill., a corporation of Illinois Original application August 24, 1940, Serial No. 354,100. Divided and this application March 26, 1941, Serial No. 385,285

6 Claims. (Cl. 204—203)

This invention relates to conveying and elevating mechanism for transporting work pieces through a plurality of tanks or compartments in order to subject the material to different treatments.

The invention is particularly adapted for use in electroplating processes wherein the work, or article being treated, is carried along through a series of tanks containing cleaning, washing, plating, or other solutions, and wherein the work is automatically transferred from one tank to another by raising and lowering of the work arms carrying the parts as the arms are conveyed along over the tanks.

The conveying and transfer mechanism is illustrated and described as embodied in an electroplating machine, wherein the operations are performed continuously and automatically. The invention, however, is not limited to this particular use.

One object of this invention is to provide a novel conveyor and elevating mechanism for return-type electroplating machines which can be installed where the ceiling height is too low to accommodate the present type automatic electroplating machines.

Another object is to provide a continuous automatic conveyor mechanism comprising an improved transfer means for transferring the work from one tank to the next, drivingly associated with a main conveying mechanism, wherein each transfer comprises a work-arm supporting guide channel which is adapted to move horizontally to and fro across the front of the transfer while held in a vertical position on upper and lower trackway.

Another object is to provide an improved automatic return-type plating machine of simplified construction having a main conveyor means for moving the work carrier arms horizontally in an orbital path carrying spaced horizontally extending work piece carrier arms movable over a plurality of tanks arranged around the sides of the conveyor with auxiliary cooperating transfer mechanism for transferring the work from one tank to the succeeding one, which machine can be assembled and shipped as a unit or in assembled sections ready to be bolted together at the place of installation minimizing the field erection cost.

Another object is to provide an automatic conveying machine for moving articles through several tanks containing solutions for treatment, which mechanism comprises a main conveyor chain and auxiliary elevating transfer means which is timed to synchronize with the main conveyor and arranged whereby the machine can be operated intermittently or continuously as desired.

Still another object is to provide a machine of the character described wherein the spacings of the work carrier arms are governed by the clearance between the racks along the straight-away path of the main conveyor rather than by the clearance between the racks when passing around the ends of the machine.

Another object is to provide an automatic conveying machine of the character described wherein novel mechanism is provided for agitating the work piece supporting racks during the process of plating.

These and other objects will be apparent from the following description taken in connection with the drawings, wherein, Figure 1 is a top plan view of a side arm plating machine embodying this invention, showing the general arrangement of the tanks and associated conveyor mechanism;

Figure 2 is an end elevation view, partly in section, with portions broken away and showing the mechanism for raising and lowering the side arm work piece carriers;

Figure 3 is an elevation view, partly in section, illustrating a modification having mechanism for agitating the racks during the process of plating;

Figure 4 is a fragmentary detail elevation view taken substantially on line 4—4 of Figure 3 and looking in the direction of the arrows.

This is a division of my application, Serial No. 354,100, filed August 24, 1940, now Patent No. 2,299,618, dated October 20, 1942.

General arrangement

In general, the mechanism of this invention is illustrated as embodied in an automatic plating machine of the side arm type. In the arrangement shown, a plurality of tanks is arranged in an elliptical path around the central mechanism provided for conveying the work pieces through the different tanks and transferring them from one tank to another. As shown in Figure 1, the tanks containing the different treating solutions are arranged at opposite sides of the central conveyor and comprise an initial treating solution for electrocleaning the parts. Following the electrocleaning tank are arranged in succession tanks containing a rinse, acid dip, rinse and the electroplating tank containing the desired plating solution. The plating tank may extend around the end and along the opposite side of the conveyor mechanism, following which is arranged a cold and hot rinse tank for treating the plated parts.

A main horizontal conveyor chain carrying side arm extended work piece carrier members spaced therealong is provided for moving the work pieces in a horizontal orbital path through and over the tanks. Auxiliary transfer pick-up chain mechanism is arranged adjacent the ends of the different tanks for engaging the work piece carrier arms and moving them off the horizontal conveyor chain and transferring the work pieces from the end of one tank into the adjacent end of the next tank. The main horizontal conveyor chain and transfer-pick-up chains are preferably driven synchronously and a single motor-driving unit is utilized for this purpose. The conveyor and transfer mechanism may be driven continuously or intermittently, as desired. Suitable means may be utilized for providing intermittent operation of the main conveyor while the transfer mechanism is running continuously. Preferably, however, the main conveyor and transfers are started and stopped simultaneously. This can be accomplished by drivingly connecting intermittent motion mechanical means to the prime mover 94 and arranging it so that transfer drive shaft 90 and main conveyor drive shaft 96 can be started and stopped intermittently simultaneously. In some cases, it will be necessary to use one or more reduction units between the drive for operating the main conveyor and the transfer mechanism.

*Conveying mechanism and associated structure*

Referring to the drawings in detail, the conveying and transfer mechanism is illustrated in connection with a side arm automatic plating machine. This machine comprises a central framework structure having a plurality of longitudinally spaced columns 17 which are suitably fastened at their lower part to the vertically spaced cross frame members 19 and 20 and lengthwise extending channel members 22 arranged at opposite sides of the columns and secured between the cross members 19 and 20. This provides a sturdy vibration-resistant framework for supporting the conveyor and transfer mechanism.

Suitably mounted on the channel members 24, which are attached at opposite sides of the upper portion of the columns 17, is the framework for the overhead track 26 which extends in an orbital path around the sides of the conveyor mechanism. The framework supporting the track 26 comprises the uprights 28 and overhead cross members 30, as shown in Figure 2. Spaced upstanding frame members 32 are suitably fastened to the outer ends of members 19 and 20 forming a support for the main conveyor chain means 34 and upper side arm carrier track means 36. The main conveyor chain 34 is arranged to move horizontally along in the guide channel member 38 carried by the brackets 39 mounted on the spaced upright members 32.

A plurality of work piece carrier arm members 40 are spaced along the main conveyor chain means 34, as shown in Figure 1. These work piece carrier arms are arranged to extend over the tanks, generally designated 42. As illustrated in Figure 2, the plating tank 44 comprises anode members 46 which are suspended on suitable supporting means 47 and immersed in the plating solution 50 contained in the tank. The carrier arm 40 extends over the sides of the tank and supports the work piece racks 52 by suitable means, as shown in Figure 2.

For conducting electric current to the work pieces, there is provided an electrical conducting bar 53, such as copper, to which the work piece racks 52 are connected. The work racks are suspended from the bottom of the carrier arm by brackets or other suitable means mounted on the copper bar 53 and bolted to the carrier arm. Current is carried by this copper bar and is transmitted by means of a brush contact to a cathode bar arranged along the upper end of the members 32 adjacent the plating tank as illustrated in Figure 2.

The side arm carrier members 40, as shown in Figures 2 and 3, comprise a horizontal arm member 55 from which the work piece racks are suspended. This horizontal arm, as shown in Figure 2, is suitably secured to a T-shaped truck or carrier shoe means 57. Rigidly secured thereto is a vertically disposed depending arm member 59. Adjacent the lower end of the depending arm member 59 is mounted a swivel castor 62 which is adapted to contact the channel guideway 64 and move horizontally therealong when the carrier arm is being conveyed along by the main chain 34. Provision is made for vertical movement of the carrier arm 40 and rear supporting portion 59 by the vertically extended channel guideways 66, as shown in Figure 2. When the carrier arm is moved vertically the swivel caster 62 rotates through 90 degrees so as to permit the carrier arm 40 and depending member 59 to be moved as a unit vertically while the caster 62 travels upward over the vertically disposed guideway portion 66.

The side arm carrier shoe 57 is supported on track 36 by means of the two flanged wheels or rollers 68, as illustrated in Figure 1. These rollers take the vertical load due to the weight of the work racks and the swivel caster 62 mounted at the bottom of the vertical carrier arm portion 59 takes the horizontal force component of this load. Elongated spaced slots 70 are provided in the carrier shoe 57 which are adapted to be engaged by the pusher pins 72 on the main carrier chain 34, whereby the carrier arms and attached work pieces are propelled along the horizontally extending track 36. The horizontal portion 55 of the carrier arm is prevented from swaying sideways during its travel on the carrier track 36 by the flanges on the two rollers 68 and by the two conveyor chain pins 72. On the carrier shoe 57 adjacent the carrier arm supporting member 59 there is provided a tapered rectangular opening 76 for receiving a similarly tapered pick-up pin means 78 on the traveling yoke member 80 which is carried by the elevating and transfer mechanism. By this means the carrier arm members are engaged and moved off of the main conveyor chain pusher pins 72 when the work pieces are to be transferred from one tank to another.

*Transfer mechanism*

In order to transfer the work pieces from the end of one tank into the forward end of the next tank there is provided an auxiliary conveyor mechanism, generally designated 85. This mechanism comprises an endless chain means 82 which is arranged to be driven vertically in a rectangular shaped orbit over the spaced sprocket members 87, as illustrated in Figures 1 and 2. The uppermost sprockets 87 are driven by means of the bevel gears 89, central longitudinally extending shaft 90 and pinion gear 91. Shaft 90 is rotated by a suitably arranged motor drive unit 94 which unit also operates the main conveyor chain through the shaft 96 and gearing 98, as shown in Figure 1. The main conveyor chain and elevating transfer chains are preferably driven synchronously and timed so that the work piece carrier arms will be moved in position to be picked up off the main conveyor chain by the pins 78 on the yokes 80 at the proper time.

The pick-up pin means 80 comprises a reciprocable yoke-like body member having a roller 102 mounted on its lower end. The upper end comprises a U-shaped head member 104 having a roller 106 mounted on the member 107 which is secured on the inwardly extending lug portions 108. On the opposite end of the U-shaped member 104 is positioned the pick-up pin means 78 for engaging in the carrier shoe opening 76. The roller 106 of the carrier pick-up pin means 80 is arranged to engage the rear side of the U-shaped guide channel member 110, whereas the roller 102 at the lower end is adapted to engage the inner side of the channel 110, as shown in Figures 2 and 3, to guide the member 80 as it travels up and down the transfer guide channel 110 and take the horizontal stresses imposed on the member 80 when it is lifting a carrier arm. Due to the cantilever suspension of the load on the carrier there is a horizontal pull exerted on the pick-up member 80 as it is being transferred. This force is taken up by the rollers 102 and 106 and is transmitted to the transfer guide channel.

The transfer guide channel 110 is suitably fastened at its ends to the upper track 26 and lower trackway 120 by bracket means 122 which are equipped with double-flanged wheel means 124. Similar flanged wheels 125 on the upper bracket are arranged to travel on the overhead trackway 26. Vertical movement of the wheel 124 off the track 120 is prevented by the guide channel flange means 126 arranged parallel and opposed to the channel trackway 120, as illustrated in Figure 2.

It will be appreciated that similar transfer mechanism is arranged on both sides of the conveyor means adjacent the end walls of the tanks.

In Figures 3 and 4, mechanism is shown for rocking the carrier arm so as to agitate the racks on which the work pieces are supported while work is being plated. The use of means for agitating the work in the plating solution is required for certain kinds of plating. However, it is not necessary to agitate the work pieces in the cleaning or rinse tanks. As shown in Figure 3, the mechanism comprises a modification of the structure shown in Figure 2, wherein a lower track portion 130 on which the carrier caster 62 rolls is hinged to the end of the member 132, as at 134, whereby it can be swung back and forth, as shown by the dotted lines in Figure 3. The supporting member 132 is suitably secured to the center columns 17.

To effect the rocking or swinging of the track portion 130 there is provided an adjustable throw eccentric member 136 which comprises a rocker arm 138 pivotally attached, as at 140, to the back of the trackway 130, as shown in Figure 3. Any number of eccentrics may be used on one track depending upon the length of the plating tank. In Figure 4 two eccentrics are shown for rocking the trackway portion. The adjustment of the eccentric controls the amplitude of the swinging movement given to the trackway 130 and by this means, the amount of agitation of the work pieces 52 may be varied as desired. The eccentric means 136 is mounted for operation on the shaft 145 and suitably driven by the bevel gear means 147 which, in turn, is actuated by the shaft 149 and bevel gear 150 operated by the prime mover 94 which is drivingly connected to the shaft 90 on which is keyed the bevel gear 152 which meshes with the bevel gear means 150.

The carrier is arranged to rock on the upper track 36 while supported thereon by the rollers 68. It will be understood that the agitating mechanism, illustrated in Figure 3, may be provided for each of the different plating tanks and/or other solution processing tanks throughout the machine where agitation of the work pieces while they are being treated is desired. Further, all of the plating tanks may be located on one side of the machine or on opposite sides of the machine with the agitating mechanism installed adjacent each tank. Where plating tanks are located on opposite sides of the conveyor, the same type of rocking mechanism can be utilized with the eccentric mounted on a common shaft. The eccentric shaft can be suitably driven from the transfer lineshaft or drive shaft through bevel gearing, as shown in Figures 3 and 4, or through vertical chain drive means between the two shafts, similarly as the auxiliary transfer mechanism 85 illustrated in Figure 2.

*Operation*

In the operation of the machine, it will be assumed that work pieces are loaded onto the spaced side arm carriers at one end of the machine, as shown in Figure 1, and the machine started so as to move the carrier arms from left to right, as shown by the arrows. As the work piece carrier arms approach the end wall of the tank it is engaged by pin means 78 on the member 80 and lifted off of the main conveyor chain and moved vertically along the transfer guide channel 110, as illustrated in Figure 2. The lower guide channel portion 66 is in line with the movable guide channel member 110 so that the caster 62 attached to the lower end of the carrier arm part 59 is guided from the channelway 64 and fixed channel portion 66 onto the movable channel 110 during the vertical movement of the carrier arm. When the carrier arm reaches the position shown in the dotted line in Figure 2 the transfer chain 114 travels horizontally across the upper sprockets carrying the pick-up pin member 80, attached carrier arm shoe 57 and carrier arm supporting channel member 110 as a unit along horizontally to a new position. When the guide channel 110 and associated carrier arm member are moved to the right the channel is brought in line with the next guide channel portion spaced adjacent the front end of the next tank, as shown in Figure 2, and the carrier arm is again lowered onto the main conveyor chain means.

In this manner, the lower portion of the carrier arm supported by the caster 62 is guided onto the lower horizontal channelway 64 and the carrier arm positioned on the main horizontal conveyor chain pins 72. The member 80 and pick-up pin 78 continue to move downward while the carrier remains momentarily at rest whereby the pin 78 is disengaged from the carrier shoe 57. Thereafter, the carrier arms and work piece racks supported thereon are moved through the solution in the tank until another end wall is approached whereupon similar transfer mechanism is provided to remove the work pieces and place them in the next succeeding tank and continue the cycle of treatment.

The main conveyor chain pusher pins 72 do not interfere with the end wall portions of the slots 70 in the carrier arm shoe member 57 because the speed of the transfer chain 114 is timed so that the carrier arm shoe 57 is lifted off the pins 72 quickly enough to prevent any interference. In setting down the carrier shoe onto the main conveyor chain, when the transfer of the work pieces into the next tank has been completed, the carrier shoe 57 is set about an inch ahead of the pusher pins 72 so that the pins come approximately in the center of the slots 70. The carrier arm shoe then remains at rest until the main conveyor pusher pins 72 have traveled forward and engaged the end walls of the slots 70 so as to push the carrier arm shoe along.

If desired, the transfer mechanism may be counterbalanced by a suitable spring or weight means. However, in the usual installation one or more transfer or pick-up carrier means are in operation while one or more carriers are being lowered so that the conveyor mechanism is sufficiently balanced without the use of special means for this purpose. It will be understood that the number of transfer mechanisms will vary according to the length of the machine and the number of tanks. In each case, however, the transfer mechanism will be arranged to pick up the carrier arms supporting the work pieces at the proper time independently of the position of the carrier arms on any of the other transfers.

It will be understood that the conveyor and transfer mechanism illustrated in connection with an automatic electroplating machine is susceptible of various forms and modifications and is applicable for other processing treatments where articles are to be conveyed from one position to another, and it is to be understood that this invention is not limited to the exact details of the construction shown except as defined by the appended claims.

Having thus fully described my invention, what I claim as new and desire to secure by Letters Patent is:

1. A conveying machine for transporting work between a series of operating stations separated by barriers for electro-processing the same, comprising a plurality of work carrier arms extending horizontally over the operating stations, means for supporting said work carrier arms on a horizontal stationary trackway, means associated with said trackway for moving said arms therealong in a horizontal path, and means including a lower pivotal trackway for swinging said work carrier arm means on said stationary trackway as the same is moved therealong for agitating the work piece during treatment, said carrier arm means being swung and moved along said trackway by a common prime mover.

2. A conveying machine for transporting work between a series of operating stations separated by barriers for electro-processing the same, comprising a plurality of work carrier arms extending horizontally over the operating stations, means for supporting said work carrier arms on a horizontal stationary trackway, means associated with said trackway for moving said arms therealong in a horizontal path, and means comprising a pivoted vertical guideway and an eccentric driven mechanism for swinging said pivoted vertical guideway and said work carrier arms on said horizontal stationary trackway as the carrier arm means is moved therealong whereby the work pieces are moved transversely of the longitudinal path of the carrier, said eccentric driven mechanism being actuated by a common prime mover with said carrier arms moving means.

3. A conveying machine for transporting work pieces along in a horizontal path while electro-processing the same, comprising work carrier horizontally extending arm means, work piece racks supported on said work piece carrier arms, means comprising a stationary upper trackway and a lower trackway for supporting and guiding said work carrier arm means during its movement, and eccentric driven mechanism for swinging the lower trackway to and fro in an arcuate movement, whereby said work carrier means is tilted back and forth on said upper trackway for agitating the work piece supporting racks during the processing treatment.

4. In combination, a frame, horizontal conveyor means supported on said frame, stationary trackway means on said frame, horizontally extending work piece carrier arms supported for movement along said trackway by said conveyor adapted to move work to be electro-processed, means for raising and lowering said work piece carrier arms as they are moved along by said horizontal conveyor, a trackway for guiding the workpiece in such vertical movement having a pivotal section and means for reciprocating said section when the carrier arms are in their lowermost position and supported in said section.

5. In combination, a frame, horizontal conveyor means supported on said frame, trackway means on said frame, work piece carrier arms supported for movement along said trackway by said conveyor, means for raising and lowering said work piece carrier arms as they are moved along by said horizontal conveyor, means comprising a vertical guide member having a pivotal section along which said work piece carrier arms are guided during their vertical movement, means for supporting said work piece carrier arms on said pivotal section of the vertical guide member, and means associated with said vertical guide member for effecting the swinging of said section and work piece carrier arms to agitate the work pieces supported thereon.

6. In combination, in an electro-processing machine, a frame, processing tanks arranged along the sides of said frame, conveyor means including work piece carrier arms for supporting and moving work pieces successively through said processing tanks, auxiliary mechanism for raising and lowering said work piece carrier arms for transferring the work pieces from one processing tank to another, guiding means therefor, including a hinged member, and means for agitating the work pieces while being conveyed through the processing tanks, said mechanism comprising reciprocating means associated with said work piece carrier arms and adapted to swing said hinged member and the work piece carrier arms to and fro as the latter are moved horizontally along by said conveyor means.

VICTOR FINSTON.